United States Patent [19]
Wenzel

[11] 4,361,295
[45] Nov. 30, 1982

[54] SOLAR POWER STATION

[76] Inventor: Joachim Wenzel, Hauptmannsreute 46, 7000 Stuttgart 1, Fed. Rep. of Germany

[21] Appl. No.: 112,220

[22] Filed: Jan. 15, 1980

[30] Foreign Application Priority Data

Jan. 15, 1979 [DE] Fed. Rep. of Germany ....... 2901404

[51] Int. Cl.³ .................... B64B 1/54; H01L 31/12
[52] U.S. Cl. .................................... 244/33; 126/424; 126/448; 415/7; 136/291
[58] Field of Search ........................ 244/31–33, 244/1 R, 159, 173; 126/424, 448; 290/55; 415/7; 60/641; 136/291–292

[56] References Cited

U.S. PATENT DOCUMENTS

| | | | |
|---|---|---|---|
| 258,005 | 5/1882 | Beeson | 244/33 |
| 603,317 | 5/1898 | Calver | 126/424 |
| 911,260 | 2/1909 | Pennock | 244/33 |
| 1,341,248 | 5/1920 | Upson | 244/33 |
| 1,874,423 | 8/1932 | Belleville | 244/33 |
| 3,229,517 | 1/1966 | Smith | 244/33 |
| 4,002,158 | 1/1977 | Radebold | 60/641 |
| 4,071,124 | 1/1978 | Price | 244/33 |
| 4,084,102 | 4/1978 | Fry et al. | 244/33 |
| 4,114,594 | 9/1978 | Meyer | 126/424 |
| 4,126,850 | 11/1978 | Randolph | 244/33 |
| 4,205,657 | 1/1980 | Kelly | 60/641 |

FOREIGN PATENT DOCUMENTS

| | | | |
|---|---|---|---|
| 794715 | 9/1968 | Canada | 244/33 |
| 298938 | 5/1920 | Fed. Rep. of Germany | 244/33 |
| 2604175 | 8/1977 | Fed. Rep. of Germany | 290/55 |
| 2616000 | 10/1977 | Fed. Rep. of Germany | 244/53 R |
| 846805 | 9/1939 | France | 244/33 |
| 860794 | 1/1941 | France | 244/33 |
| 252312 | 1/1927 | United Kingdom | 244/33 |
| 489139 | 7/1938 | United Kingdom | 415/7 |
| 546966 | 8/1942 | United Kingdom | 244/33 |

OTHER PUBLICATIONS

Booda, "Space Plane Grows Into Family of Concepts", Aviation Week, Jun. 19, 1961, pp. 54–55, 59, 61, 62.
Cherry, "A Concept for Generating Commercial Electrical Power from Sunlight", 8th IEEE Photovoltaic Conf., Aug. 4–6, 1970, Seattle, Wash.

*Primary Examiner*—Galen L. Barefoot

[57] ABSTRACT

Solar power station with semiconductor solar cells for generating electric power, wherein the semiconductor solar cells are provided on a member such as a balloon or a kite which carries the solar cells into the air. The function of the balloon or kite can also be fulfilled by a glider or airship. The solar power station can be operated by allowing the system to ascend at sunrise and descend at sunset or when the wind is going to be too strong in order to avoid any demage.

14 Claims, 10 Drawing Figures

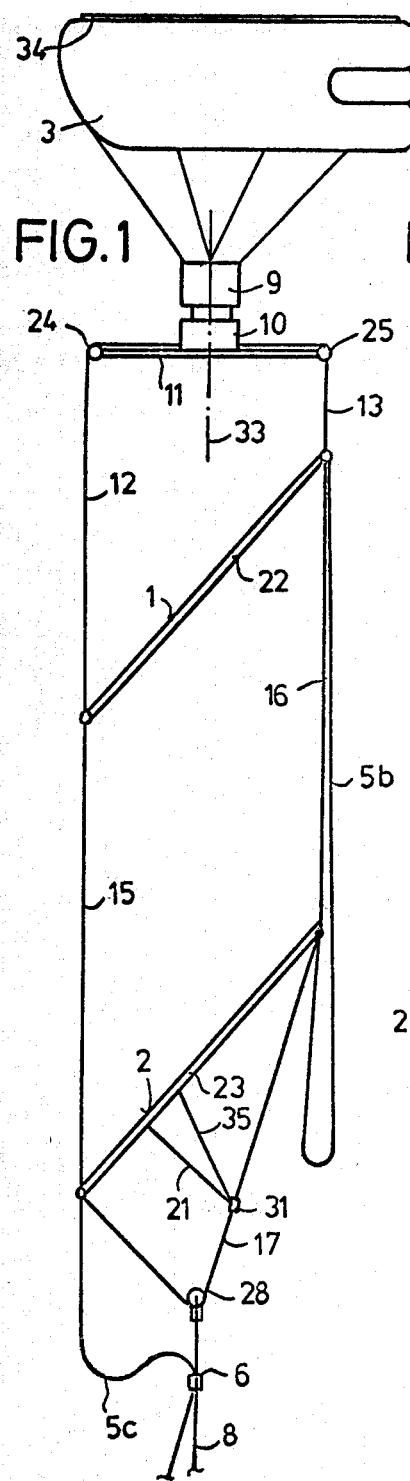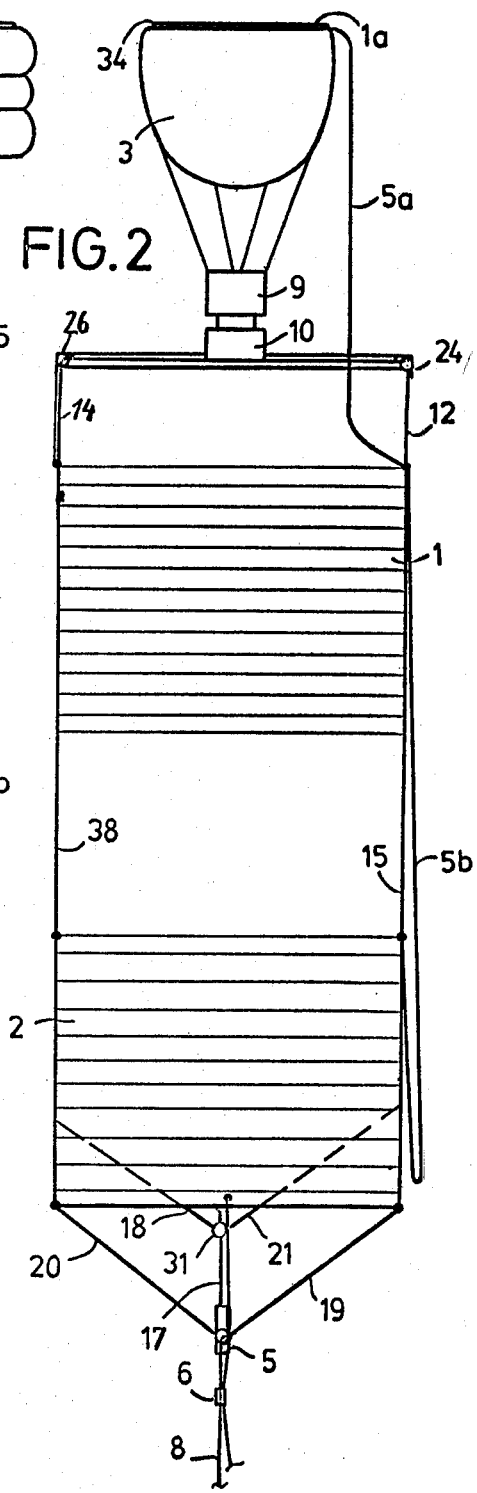

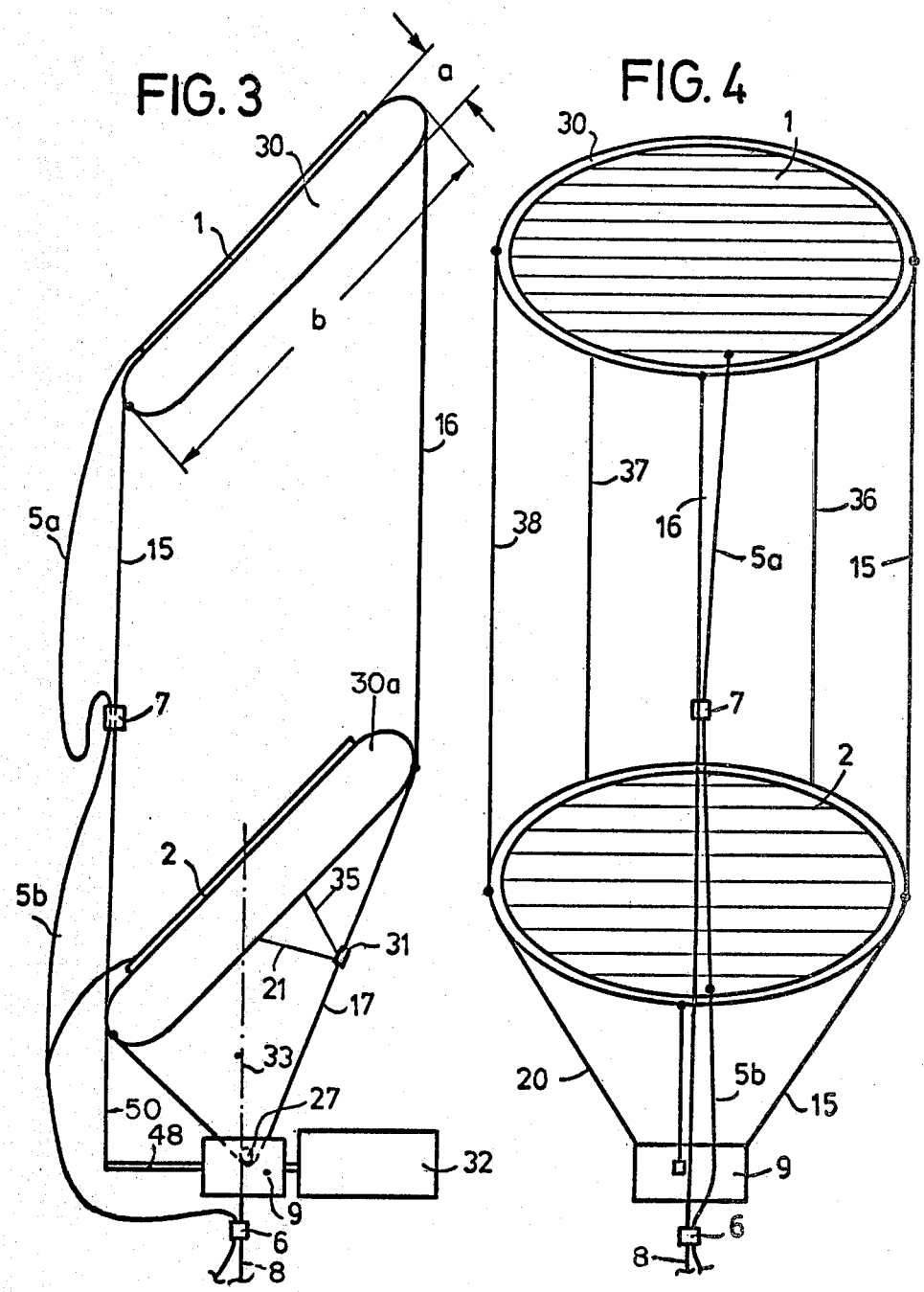

SOLAR POWER STATION

BACKGROUND OF THE INVENTION

The invention relates to a solar power station with semiconductor solar cells for generating electrical current. Such power stations have been satisfactorily used in space technology for many years due to their great simplicity. The intensity of solar radiation in space is 1353 W/m$^2$.

However, for terrestrial use only 700 W/m$^2$ can be expected in fine weather and only 70 W/m$^2$ in overcast and rainy weather in the German Federal Republic. Thus, as a yearly average only about 120 W/m$^2$ is available. However, this conceals the fact that in the winter months the average irradiation values are very low and only about 20 W/m$^2$. Thus, for the industrial use of solar energy in our latitudes the Expert considers that a correspondingly large electrical accumulator is indispensable, but as yet no such accumulators exist.

As most people live in apartment blocks the roof area has proved to be inadequate. In addition, the floor space requirement for charging stations is far too great. Therefore the Expert is of the opinion that at the best extensive use is only possible in the sunnier developing countries.

BRIEF SUMMARY OF THE INVENTION

The problem of the invention is to solve the above-mentioned problem of the floor space requirement, so that in all conceivable cases adequate space is available for the solar cells.

According to the invention this problem is solved in that the semiconductor solar cells are located on a member, such as a balloon or a kite which carries the solar cells into the air.

BRIEF DESCRIPTION OF THE DRAWINGS

The invention is described in greater detail hereinafter relative to non-limitative embodiments and the attached drawings, wherein show:

FIG. 1—a diagrammatic side view of a first embodiment.

FIG. 2—a view from the front of the embodiment of FIG. 1.

FIG. 3—a side view, like FIG. 1 of a further embodiment.

FIG. 4—a view from the front of the embodiment of FIG. 3.

DETAILED DESCRIPTION OF THE PREFERRED EMBODIMENTS

Figure 5:
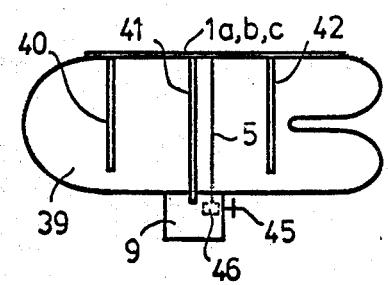
FIG. 5—a side view of a further embodiment.

At the top of FIG. 1 it is possible to see a captive balloon or kite 3, having an upper planar surface 34, as can also be gathered from FIG. 2 which is provided with solar cells 1a. The solar cells are of an inexpensive type, there being no need to follow the sun.

The basket 9 is suspended from cables and its lower part 10 is rotatable about the vertical axis 33 by an automatic control or a remote control means. A cross-member 11, which is cross-shaped in plan view is fitted to part 10. On the four corners of the cross are placed the cable pulleys 24, 25, 26 and a fourth cable pulley locate d behind the same and over which run the two cables 12 and 13, to which is fixed at an angle to the vertical plate 22. Plate 22 is equipped with solar cells 1, which can cooperate with known concentrators, because there is in this case a biaxial following of the sun, as will be explained in greater detail hereinafter.

Plates 23 suspended on cables 15 and 16 can be constructed in the same way as plate 22 and is equipped with solar cells 2 with concentrators.

At the top and bottom cable 17 is connected to plate 23 and in the represented manner carries the guy line 8 over a pulley 28. Thus, the entire weight of the e.g. 11 km long guy line 8 is suspended on cable 17. Thus, the suspension means with plates 22 and 23 is therefore secured between basket 9 and the weight of line 8 and the weight of cable 5. Cable portion 5a leads from solar cells 1a to solar cells 1, cable portion 5b from there to the solar cells 2, whilst cable portion 5c is inter alia fixed by a clip 6 to guy line 8. In all cases the cable length between the clamping points is much larger than the distance between said points, so that on extending line 8 and the remaining cables or lines cable 5 is not stressed. The clamping points 6 are distributed over the length of guy line 8, so that only a limited tensile stressing of cable 5 through the specific gravity of the secured line is possible.

The cable 17 guided by pulley 28 is connected via a ring 31 with numerous cables 18, 21 and 35 and their number increases in proportion to the size of the plate 23. In a similar manner the other end of cable 17 can be joined by a not shown ring to plate 23. This is necessary, so that even with high wind loading a reliable guidance of cable 17 is ensured.

FIG. 2 shows the same as FIG. 1. In FIG. 2 it is also possible to see cable portion 5a, plates 22 and 23 being approximately square, being completely covered on the side facing the sun with solar cells 1 and 2 arranged in rows.

Hereinafter the function of the embodiment of FIGS. 1 and 2 is described. The balloon or kite 3 in known manner always positions itself in accordance with the wind. The represented captive balloon 3 can also be replaced by a conventional balloon or kite, which is not then equipped with solar cells 1a. The special shape of balloon 3 can consequently relate to an additional further embodiment which is independent thereof.

Plate 22 is provided with a not shown solar sensor, which is connected to a regulating device in basket 9. Thus, the lower rotary part 10 is rotated with respect to the upper part until solar radiation is at a maximum. The rotary drive automatically stops when, on further rotation, solar radiation decreases. Regulating devices of this type are known in the art and need not therefore be described in greater detail. In this way the rotary drive is automatically operated in order to make plates 22 and 23 constantly follow the position of the sun around axis 33. Remote control is also possible, so that the rotary drive is operated from the earth, even when the wind direction changes.

It is hereby necessary for plates 22 and 23 to assume a different rotary position with respect to basket 9 which rotates with the balloon 3 in accordance with the wind.

However, an automatic adjustment of the angle of incidence of plates 22 and 23 with respect to solar radiation is necessary. Thus, in winter an angle of e.g. approximately 60° is necessary, whereas in summer it can be 45°. To this end a not shown cable winch 27 is arranged in the lower part 10 onto which are wound the two cables 12 and 13, as well as 14 and also a further cable in such a way that on rotating the cable winch the two cables 12 and 14 are e.g. shortened, i.e. drawn into part 10, whilst the cable 13 and the other not shown cable are loosened. Thus, four cables can be wound onto a common winch. It is obvious that if cable 12 is shortened and cable 13 according to FIG. 1 is loosened the angle is correspondingly changed. It is even possible to further change the angle, namely up to approximately 9°, so that then the two plates 22 and 23 are parallel to the ground. Plate 23 is in any case moved along by cables 15 and 16 and is therefore always parallel to plate 22. This special position can be desirable to prevent excessive stressing of the plates as a result of gales, leading to separation.

In addition to the two plates 22 and 23 a random number of further plates constructed and functioning in the same way can be arranged thereunder.

This embodiment more particularly shows the advantage that a random balloon or kite can be used.

FIGS. 3 and 4 show a preferred embodiment of the invention, which is greatly simplified, but necessitates a special construction of the balloon 30. In order that the surface receiving the solar cells 1 and 2 has a maximum size balloon 30 is in this case constructed in a disc-shaped manner, its thickness a being much smaller than its longitudinal extension or diameter b. The smaller the ratio a/b the greater the surface area for the same volume. Naturally there are limits to this, because the specific gravity also increases.

Obviously such balloons can be constructed with a random size, but it is assumed that for handling reasons a particular maximum size will be shown as economic.

In the same way as previously plates 22 and 23 the disc-shaped balloons 30 are interconnected by cables 15, 16, 36, 37 and 38, whereby as a function of the balloon size a much larger number of cables can be provided, which are parallel to one another as shown in FIG. 4.

According to FIG. 1 there is also a clamping point 7 on cable 15 and to which is fixed cable 5 with the represented sag, in the manner referred to hereinbefore. At clamping points 6 and 7 there are also warning flashing lights for aircraft and they can be energised both by the large cable 5 and by an additional, not shown low voltage current cable.

The connection between the lower disc-shaped balloon 30a and the basket 9 is similar to the connection between plate 23 and cable 8. Therefore the same reference numerals are used here. Cable 17 is not in this case guided round a pulley, and is instead guided round a cable winch 27, driven in the same way as the winch in part 10 according to FIGS. 1 and 2. As soon as it rotates cable 17 is moved in a direction by which the angle of incidence with respect to the vertical axis 33 is modified. Here again the possibility exists of bringing balloons 30 and 30a into the horizontal position by operating winch 27, the surfaces receiving the solar cells 1 and 2 pointing upwards, so that even e.g. in the case of a violent gale they can still produce some energy.

In this embodiment of the invention there is no need to make the lower part of the basket rotatable. Instead a wind indicator 32 is provided, which in normal cases is freely rotatable about the vertical axis 33 by the wind. However, for rotating balloons 30 and 30a a coupling with a drive is necessary here permitting the basket to be rotated by a small angle with respect to wind indicator 32. It can naturally also be said that wind indicator 32 is rotatable relative to basket 9. Therefore basket 9 rotates relative to the wind indicator 32 and carries with it the balloon via radial arm 49, which is fixed to basket 9 and cable 50. As soon as the new rotation position of the balloon is reached the drive is disengaged again, so that the wind indicator 32 again moves freely round axis 33 in accordance with the wind direction, without the balloon following this movement.

The radial arm 49 is advantageous, because in practice the size difference between basket 9 and the balloon is so great that the balloon would not directly follow a small rotation of basket 9. Thus, such an arm 49 can also be provided on the basket 9 according to FIGS. 1 and 2, where there is a danger that the basket 9 will rotate on rotating the cross-member 11.

Compared with the preceding embodiment this also leads to the advantage that, in addition to the weight of the guying line 8, the weight of the basket 9 has a stabilising effect on balloon 30, 30a. There is also no need for plates 22 and 23, because the e.g. semi-rigid balloon can be constructed with an adequately planar surface, without it being necessary to involve the weight and expenditure associated with these plates. It must be borne in mind that the weight of the solar cells is relatively small, even with the above-mentioned concentrators. It is also not prejudicial if the surfaces are slightly elastic, particularly as no significant forces have to be absorbed, unlike in the case of FIGS. 1 and 2. This is particularly important with the size of surfaces 1 and 2 of e.g. 1000 $m^2$. The solar cells together with the concentrators can be stuck, sewn, riveted, welded or in some other way fixed to the outer covering of balloons 30, 30a. In view of the size of the surface area it will naturally be subdivided into smaller portions, as is conventionally the case with solar cells. FIG. 4 shows a rectilinear subdivision of the solar cells, together with the concentrators. Obviously each line is individually fixed to the outer covering of the balloon, whilst further subdivisions at right angles thereto are advantageous in the case of very great lengths.

To keep the a/b ratio as small as possible it can also be advantageous to raise the represented arrangement according to FIGS. 3 and 4 by an additional balloon or kite which will keep it in the air.

FIG. 5 shows an airship such as is e.g. used for advertising purposes or for transporting loads in roadless areas. Such airships are particularly used in sunny developing countries. The upper part is once again flattened to receive the solar cells 1, in much the same way as in FIGS. 1 and 2. However, if this is not adequate it is also possible to provide in approximately the same plane further plate-like members with solar cells 1b, 1c, which can also be reinforced by stays 40, 41 and 42. In this case cable 5 is passed via the outer covering to the engine 46 in basket 9 for the direct driving of the airship by propeller 45.

An airship driven in this way naturally has the advantage that no fuel has to be carried and the range is unlimited. However, when travelling at night a battery must be carried. In addition, the noise level is very low.

Figure 6:
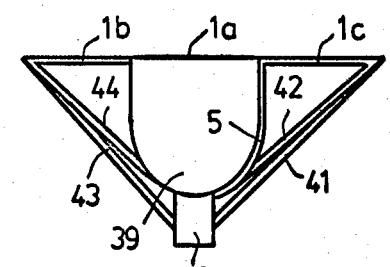
FIG. 6—a view from the front of the embodiment of FIG. 5.

FIG. 6 shows much the same as in FIG. 5 and once again stays 41 to 44 are provided. Naturally these stays and the additional surfaces 1b, 1c slightly increase the aerodynamic drag of the airship, but this is of a minor importance compared with the indicated advantages at the low speeds at which airships travel. The battery would naturally be charged, e.g. when loading the airship.

It is also possible to cover the complete outer covering with solar cells, thereby utilising reflection radiation from below.

Figure 7:
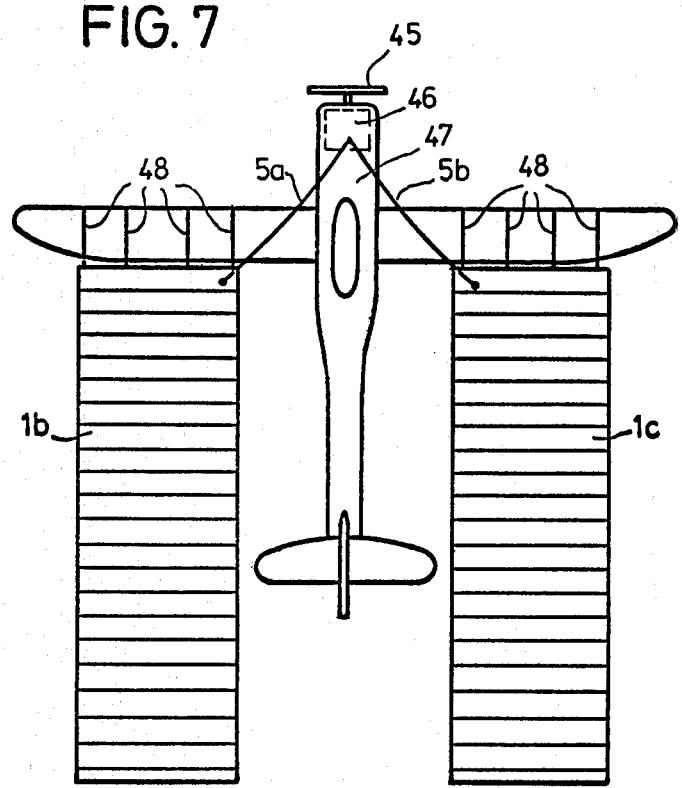
FIG. 7—a plan view of another embodiment.

FIG. 7 shows an engine-powered glider which can be used for gliding and for powered flight. Engine 46 is conventionally designed in such a way that it is just powerful enough to ensure take takeoff. As is known the speed of such aircrafts is very low.

According to the invention a relatively thin web-like material strip is fixed to each of the two wings. These are solar cells $1b$, $1c$ without concentrators having e.g. a wall thickness of only 1 mm and a correspondingly low weight. Naturally the necessary wiring leads to a certain weight of the material strip, but if the cables are kept as fine as possible the possibility is provided for making the material strips very light and thin. The solar cells can be embedded in transparent and slightly elastic plastic material and preferably form a continuous smooth unit with the material strip, so that there is a minimum aerodynamic drag.

As a result of the plastic cables 48 which are passed around the wings in the represented manner the material strips are fixed to the trailing edges of the wings or the tail. There is no doubt that as a result of the travelling wind the material strip is held approximately horizontal to the ground during horizontal flight, so that no further fixing is necessary. They can also be made sufficiently long for the surface area to be adequate to supply the relatively weak engine 46 via cables $5a$ and $5b$ without any need for a battery. In the case of inadequate solar radiation it is possible to glide.

The material strips according to the invention with solar cells $1c$ and $1b$ according to FIG. 7 can naturally also be used with airships or kites and are preferably also fixed to the trailing edge of the airships or kites. They can be made from textiles or plastic materials and these must be at least partly elastic. The movements occurring in the air are not generally prejudicial.

Both sides of the strips $1b$, $1c$ can be provided with solar cells in order to be able to additionally utilise the reflection radiation from the layer of clouds.

The object of the invention can also be used with earth-bound vehicles, e.g. when working in the fields agricultural machinerycan permit the ascent of a kite or balloon with the object of the invention in order to charge the batteries. The same possibility exists with watercraft of all types, particularly slowly moving freighters. At night these ships can be energised by a battery, particularly in view of the fact that the carrying of large loads presents no difficulty in the case of a freighter. In addition, in such cases an auxiliary drive can also be provided, which is preferably used for charging the battery at night. Of decisive importance is the fact that in poor weather and up to a certain wind strength the energy supply is provided by allowing the balloon to ascend to a sufficient altitude.

This naturally applies more particularly to large power stations, whereby it is vital that reliable energy production is also possible in the winter months. As is known more electric power is consumed in winter than in summer. Even if large electrical accumulators were present it would represent a very considerable expenditure in winter, which would exclude use in temperature zones. However, the invention provides the possibility of generating power in this way in northern countries, because the advantage exists that the days are much longer there than in southern latitudes. In addition, the sunshines for more hours.

A further advantage is the easy mobility, at least up to a certain size. During daylight hours the object of the invention is suitable for forming an emergency generating set. It can in fact be installed in a relatively short time at a random location. Up to a certain size both balloons and kites with the associated cables can be transported on trucks.

In the case of the said large power stations a plurality of balloons 3 (cf FIG. 8) can be arranged at relatively short distances from one another in a row running from east to west and can be interconnected by at least one cable 55. This ensures that the balloons 3 or guying lines 15, 16 do not collide with one another. It is obviously also possible to at least guy the outer balloon $3a$, $3b$ of such a row to the ground by additional lines $54a$, $54b$ and which are remote from the true guying line. The existing plastic urging lines are relatively light and have a very considerable strength and elasticity.

There is no need for all the balloons or kites according to the invention to be stationed at a height of 11 km. In Europe most clouds are at a much lower height of max. 2 km, so that then shorter cable lengths would be possible.

The invention is not restricted to the represented embodiments. Since due to further developments and mass production the price of solar cells will drop it is advantageous to equip all sides of the balloons or kites with solar cells, because it is then worthwhile to utilise the small quantity of electricity generated on the side opposite to the sun. Reflection radiation is particularly great from cloud layers and snow.

If in the case of smaller installations the balloon or kite is only allowed to ascend to a lesser height the possibility also exists in per se known manner of combining together solar cells and heat collectors. In this case, in addition to cable 5, a hose 56 is used in order to pass hot air directly into a building for heating purposes. Such hybrid systems are well known to the Expert and need not therefore be described in detail here. It is also possible to use thin layer solar cells.

The embodiment of FIGS. 1 and 2 also has the advantage that it is very simple, because only one rotation axis is required for a very large surface area and furthermore the suspended construction is less complicated and costly. It can therefore advantageously be used on the ground. To this end e.g. to the top of a television tower is fixed a radial arm on which the construction is suspended, naturally without the balloon. Guying can then take place to the ground by means of a plurality of lines instead of line 8. In this way several thousand $m^2$ can be installed on each tower, so that preference is given to this embodiment.

It is finally also possible in preferred manner to provide a balloon with a transparent outer covering and inner covering and to arrange the plates 22 and 23 according to FIGS. 1 and 2 with the remaining construction in the gas-filled space. This naturally has the advantage that the aerodynamic drag is not increased. It is also possible in this case to follow the sun with concentrators. The transparent coverings can also be very elastic, because they do not have to receive the cells and there is no need to provide the cells with a transparent covering.

Figure 8:
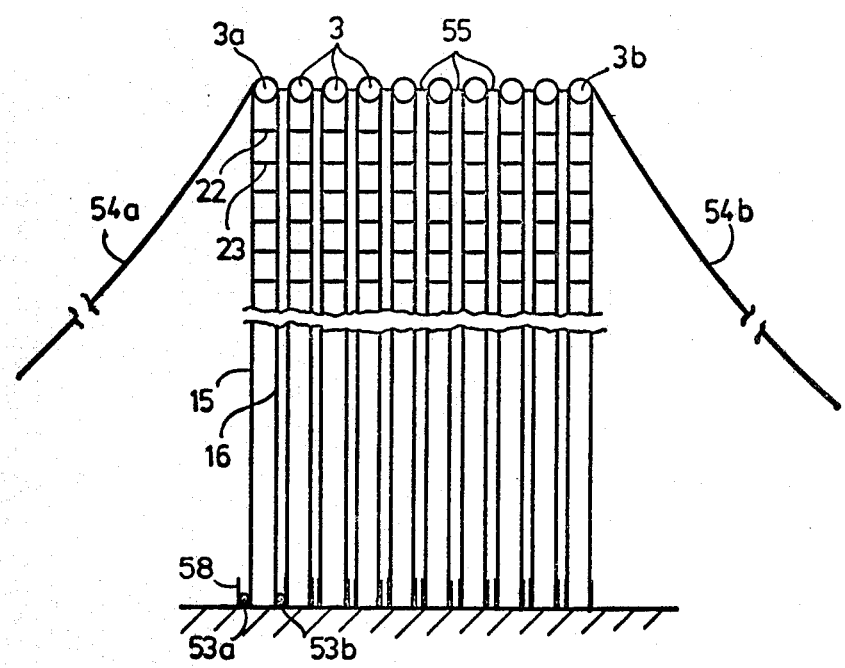
FIG. 8—a diagrammatic view of a multiple arrangement.

FIG. 8 shows a large number of balloons 3 interconnected by short cables 55. To the left and right it is possible to see cables 54a, 54b, which are anchored a long way from the ground station. Plates 22, 23 with the cells are arranged parallel to the ground and can be constructed as flat kites. Thus, with sufficient wind this installation can be used without the balloons 3 as a kite system. In this case they are not really plates, but are preferable fibre-reinforced foils, as shown in FIG. 7 with respect to foils 1b, 1c. In the ground station there is a stacker 58 which stacks in superimposed manner the plates or kites 22, 23 provided with a frame, whereby they are detached from cables 15, 16. Thus, the system can be allowed to ascend in the morning and descend in the evening in a rapid manner and minimum labour requirements. Stackers of this type are known and need not be described in detail. As shown the guying lines 15, 16 are fixed externally to the kite frame, so that they can easily be detached therefrom.

Such an arrangement can also be provided on a freighter, e.g. a tanker, whereby it extends over most of the deck.

Preference is given to an east to west direction of this row, so that at no time does the shadow of any one kite fall on another. The relatively large number of spherical balloons 3 can be replaced by fewer elongated balloons, which are always aligned with the wind.

Figure 9:
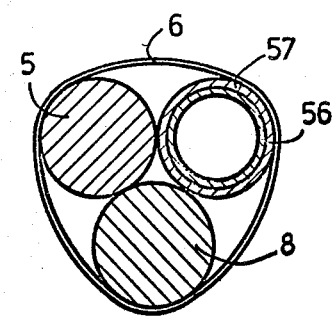
FIG. 9—a section through a clamping attachment.

FIG. 9 shows a section through the guying line 8 to which is secured, in addition to cable 5, a hose by means of the clamping member 6. As hose 56 is easily compressed by the clamping force it is covered with a high-strength aluminum or plastic sleeve 57, said sleeve having the same width as strip-like clamping member 6. When used at considerable altitudes the system can be left in the air overnight. The hose can then be desirable to compensate gas losses due to leaks. Like cable 5 it is significantly longer than line 8 to prevent excessive stressing during extension. Preferably both the cable and the hose are helically arranged in loose coils around the line.

Figure 10:
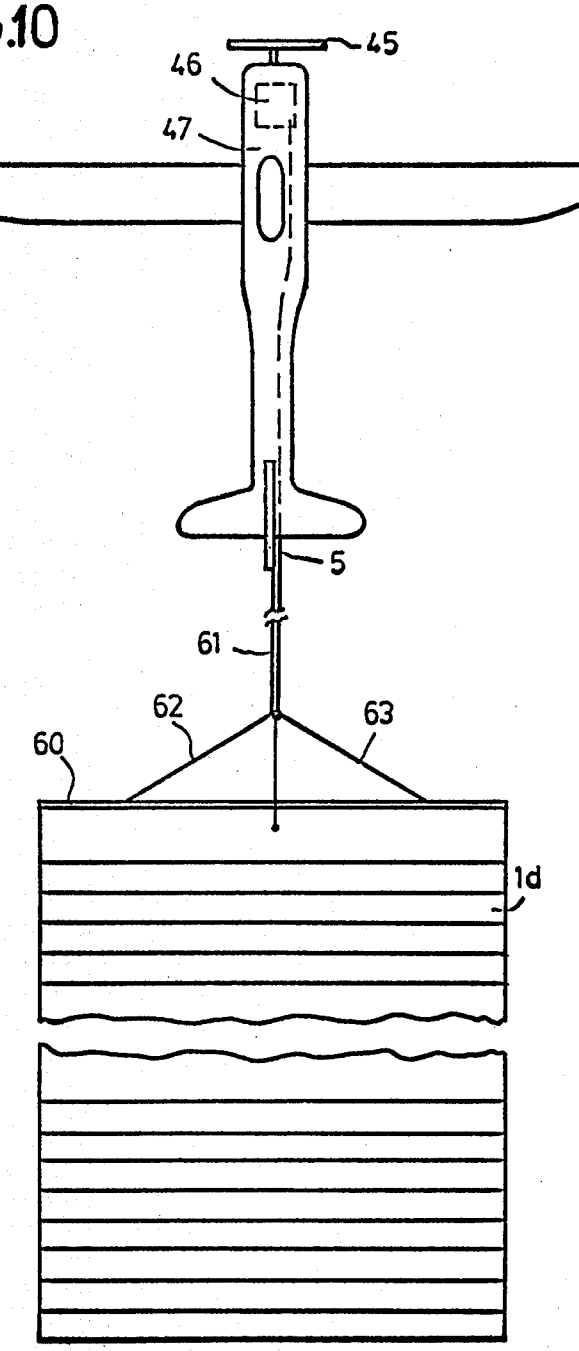
FIG. 10—another construction similar to FIG. 7.

FIG. 10 shows another construction of the aircraft drive system of FIG. 7. The solar foil 1d is in this case arranged at the back on a towing cable 61, which has two branches 62, 63 to a rod 60 to which is fixed the solar foil 1d with the cells. cable 5 is passed through two fuselage or aircraft 47.

Such a solar foil is universely usable and can for example be connected to a kite frame and then forms the covering thereof. This is obvious to the kite Expert, particularly as rectangular kites are commercially available. In this way the foil can also be used for charging the batteries when the aircraft is not in the air. The underside of the foil can also be equipped with solar cells in order to utilise the reflection radiation from the lower cloud layer or the ground. In order to avoid any damage by strong wind it is prefered to descend the power station when the wind is going to reach a certain strength.

What is claimed is:

1. A solar power station comprising a plurality of substantially planar solar cell members each capable of producing electric current, flexible cable means connecting said solar cell members in spaced parallel with each other along a common axis, means for supporting said connected solar cell members airborne above the ground with said solar cell members suspended vertically along said common axis, a basket operatively arranged with said means for supporting said connected solar members and said flexible cable means, said basket including a part rotatable about the common axis having an array of crossed arms on which said flexible cable means are attached, and means for rotating said suspended solar collector members relative to the means for supporting said solar cell members, and a conductive cable interconnecting said solar cell member to conduct the current to the ground.

2. The power station according to claim 1 including means for adjusting said connecting flexible cable means to vary the angle of said solar cell members with respect to said common axis.

3. The power station according to claim 1 including a guy line for securing said station to the ground.

4. The power station according to claim 3 wherein said conductive cable is secured to said solar cell members and to points along said guy line and the length of conductive cable between said points is greater than the length of the guy line between said points.

5. The power station according to claim 1 including motor means responsive to the intensity of the sun for rotating said rotatable part.

6. The power station according to claim 1 wherein the means for varying the angle of said solar cell members, include a winch located on said rotary part, a pair of opposed pulleys mounted on said cross members, and said flexible cables means included a pair of flexible lines each connected at one end to at least one of said solar cell members and entrained over at least one of said pulleys and attached at its other end to said winch.

7. The power station according to claim 1 including motor means for driving said winch responsive to means for sensing the intensity of the radiation of the sun to rotate said solar cell members.

8. The power station according to claim 3 wherein a lowermost of said solar cell members has dependency therefrom a loop of cable, and said guy line is connected thereto by a pulley.

9. The power station according to claim 1 wherein said means for supporting said solar cell members comprises a balloon.

10. The power station according to claim 1 wherein said means for support said solar cell members comprises a kite.

11. A solar power station according to claim 1 wherein said means for support comprises a plurality of balloons arranged with limited spacing in a row running in an east-west direction and are interconnected by at least one cable.

12. A solar power station according to claim 11 including means located on the ground for receiving said solar cell members and permitting their stacking on collapse of the connecting cables.

13. A solar power station according to claim 12 wherein said flexible cable means are detachably secured to said solar cell members.

14. A solar power station according to claim 13 including winch means for reeling said flexible cable means.

* * * * *